(12) United States Patent
Okaniwa et al.

(10) Patent No.: US 11,142,143 B2
(45) Date of Patent: Oct. 12, 2021

(54) CLAMP FOR WIRE HARNESS

(71) Applicant: SUMITOMO WIRING SYSTEMS, LTD., Yokkaichi (JP)

(72) Inventors: Hirozumi Okaniwa, Yokkaichi (JP); Hironobu Kawabe, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 771 days.

(21) Appl. No.: 15/777,390

(22) PCT Filed: Nov. 7, 2016

(86) PCT No.: PCT/JP2016/082910
§ 371 (c)(1),
(2) Date: May 18, 2018

(87) PCT Pub. No.: WO2017/090411
PCT Pub. Date: Jun. 1, 2017

(65) Prior Publication Data
US 2021/0197739 A1    Jul. 1, 2021

(30) Foreign Application Priority Data
Nov. 24, 2015    (JP) .............................. JP2015-228387

(51) Int. Cl.
*H02G 3/32*    (2006.01)
*B60R 16/02*    (2006.01)
*H02G 3/04*    (2006.01)

(52) U.S. Cl.
CPC ........... *B60R 16/0215* (2013.01); *H02G 3/32* (2013.01); *H02G 3/0468* (2013.01)

(58) Field of Classification Search
CPC .... B60R 16/0215; H02G 3/32; H02G 3/0468; F16L 3/12; H05K 7/00
(Continued)

(56) References Cited

U.S. PATENT DOCUMENTS 3,118,200 A * 1/1964 Bell .................. B65D 63/1081
24/16 PB
4,971,317 A * 11/1990 Link .................. A63B 22/0694
482/57
(Continued)

FOREIGN PATENT DOCUMENTS

CN    202806631    *    3/2013
JP    S49138386 U        11/1974
(Continued)

OTHER PUBLICATIONS

International Search Report for Application No. PCT/JP2016/082910 dated Dec. 6, 2016; 6 pages.

*Primary Examiner* — Timothy J Thompson
*Assistant Examiner* — Michael F McAllister
(74) *Attorney, Agent, or Firm* — Reising Ethington PC

(57) ABSTRACT

A clamp attached to a wire harness is attached to a section of a vehicle body where a clamp hole cannot be formed in the vehicle body. The clamp is constituted by a band clamp that wraps a band around the wire harness, a base plate-type clamp that uses a piece of pressure-sensitive adhesive tape, or a corrugated clamp to be attached to a corrugated tube in which a wire harness is inserted. The clamp includes a wire harness attachment portion constituted by a band and a band locking box of the band clamp, a base plate of the base plate-type clamp, or an externally fitted portion of the corrugated clamp; and a suction cup protruding from the wire harness attachment portion, wherein the clamp has a structure in which the suction cup is pressed against and spread out on a vehicle body surface for suction thereto.

2 Claims, 6 Drawing Sheets

(58) Field of Classification Search
USPC .......................................................... 174/72 R
See application file for complete search history.

(56) References Cited

U.S. PATENT DOCUMENTS

| | | | | |
|---|---|---|---|---|
| 5,762,305 | A * | 6/1998 | Lee ........................ | A45B 11/00 |
| | | | | 248/205.5 |
| 7,661,633 | B2 * | 2/2010 | Igarashi ................ | F16L 3/2334 |
| | | | | 248/74.3 |
| 8,955,198 | B2 * | 2/2015 | Carnevali .......... | B65D 63/1063 |
| | | | | 24/16 PB |
| 2009/0166497 | A1 * | 7/2009 | Carnevali ................ | F16B 47/00 |
| | | | | 248/309.4 |
| 2012/0024918 | A1 * | 2/2012 | DeCamp ................ | F16M 13/04 |
| | | | | 224/267 |
| 2014/0151514 | A1 | 6/2014 | Asai | |
| 2016/0047494 | A1 * | 2/2016 | Dickinson ................ | F16B 1/00 |
| | | | | 248/74.2 |

FOREIGN PATENT DOCUMENTS

| | | |
|---|---|---|
| JP | H0658524 U | 8/1994 |
| JP | 2002218634 A | 8/2002 |
| JP | 2004129445 A | 4/2004 |

\* cited by examiner

*Figure 11A*
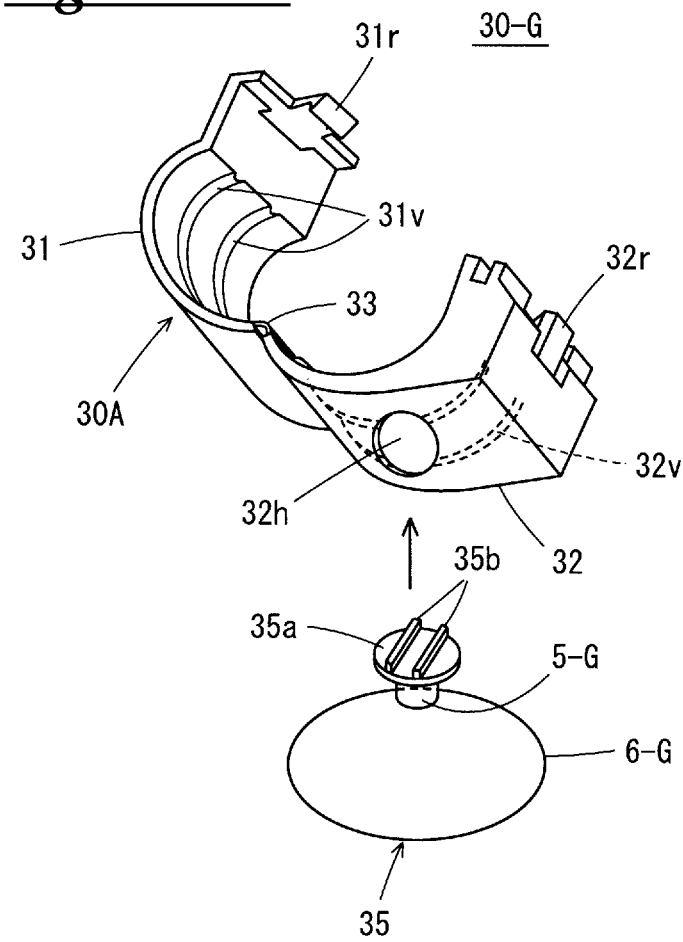
*Figure 11B*
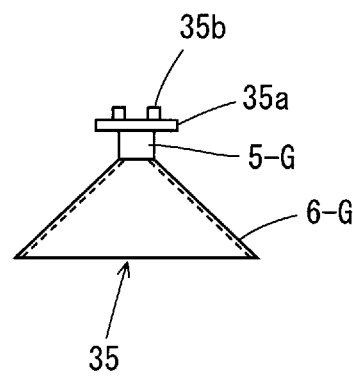
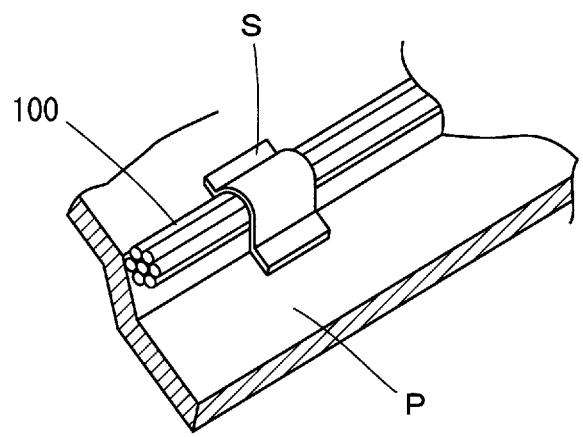
*Figure 12*

CLAMP FOR WIRE HARNESS

CROSS REFERENCE TO RELATED APPLICATIONS

This application claims the priority of Japanese patent application JP2015-228387 filed on Nov. 24, 2015, the entire contents of which are incorporated herein.

TECHNICAL FIELD

The present invention relates to a clamp for a wire harness, and particularly relates to a clamp for attaching a wire harness routed in an automobile to an attachment target member, such as a vehicle body, and for use in a section where a clamp hole cannot be formed in the vehicle body.

BACKGROUND ART

Conventionally, wire harnesses routed in automobiles and the like are often fixed to vehicle bodies by attaching a band clamp or the like to a necessary section of a wire harness and inserting and locking a locking strip provided at a leading end of a band of the band clamp to a clamp hole formed in a vehicle body. A band clamp of this type was proposed in JP 2004-129445A or the like.

Base plate-type clamps, which are used as widely as band clamps, also have a structure in which a locking strip is provided protruding from a base plate attached to a wire harness by wrapping a piece of pressure-sensitive adhesive tape therearound, and is inserted into and locked to a clamp hole formed in a vehicle body.

Moreover, in the case where a wire harness is inserted into a corrugated tube, and the corrugated tube is attached to a vehicle body panel or the like, a corrugated clamp is used. As is the case with band clamps, many corrugated clamps are of a type in which a locking strip is provided protruding from an outer surface of a circular ring portion externally fitted to a corrugated tube, and is inserted into and locked to a clamp hole formed in a vehicle body panel. Note that, although there are also corrugated clamps of a type in which a locking protrusion, such as a tab, provided protruding from a vehicle body is inserted into and locked to a locking slot provided in the outer surface of the circular ring portion, it is necessary in this case to provide a locking protrusion protruding from the vehicle body, and the locking protrusion cannot be provided in some sections of the vehicle body.

As described above, a clamp for fixing a wire harness to a vehicle body requires that a locking strip is inserted into and fixed to a clamp hole formed in the vehicle body, and therefore cannot be used in a section where a clamp hole cannot be formed in a vehicle body panel.

For this reason, as shown in FIG. 12, in a section where a clamp hole cannot be provided in the vehicle body, a wire harness 100 is attached to a fixing target member, such as a vehicle body panel P, with a pressure-sensitive adhesive sheet S being applied and stuck to the surface of the wire harness 100 and the surface of the fixing target member. In the case where a wire harness is inserted into a corrugated tube, the corrugated tube is stuck to a vehicle body panel or the like using a piece of pressure-sensitive adhesive tape.

SUMMARY

In the case where a wire harness is stuck to a fixing target member, such as a vehicle body panel, using a pressure-sensitive adhesive sheet S as shown in FIG. 12, the sticking position is likely to shift during attachment. Moreover, dirt and dust may adhere to a section that has peeled away from the vehicle body panel, resulting in low attachment strength, and thus displacement is likely to occur due to vibrations in the vehicle and the like. There is a risk that if displacement occurs, the wire harness will interfere with a device in a surrounding region and be damaged. Furthermore, when a wire harness is attached to a vehicle body or the like using a piece of pressure-sensitive adhesive tape, the appearance is not appealing.

The present disclosure has been made in view of the above-described problems, and it is an object thereof to provide a clamp for a wire harness with which, in a section where a clamp hole cannot be formed in a fixing target member such as a vehicle body panel, a wire harness can be attached to the fixing target member, such as a vehicle body, without using pressure-sensitive adhesive tape and with an attachment strength that does not allow displacement to occur.

To achieve the above-described object, the present disclosure provides a clamp for a wire harness constituted by a band clamp to be attached to a wire harness routed in a vehicle by wrapping a band around the wire harness, a base plate-type clamp to be attached to a wire harness using a piece of pressure-sensitive adhesive tape, or a corrugated clamp to be attached to a corrugated tube in which a wire harness is inserted, the clamp including:

a wire harness attachment portion constituted by a band and a band locking box of the band clamp, a base plate of the base plate-type clamp, or an externally fitted portion of the corrugated clamp to be externally fitted to the corrugated tube; and a suction cup protruding from the wire harness attachment portion, wherein the clamp has a structure in which the suction cup is pressed against and spread out on a vehicle body surface to be thereby fixed thereto through suction.

With the above-described configuration in which the suction cup is provided protruding from the wire harness attachment portion, when the suction cup is pressed against and thereby caused to adhere to the vehicle body surface through vacuum suction, atmospheric pressure on the outside of the suction cup prevents the suction cup from detaching from the vehicle body, and thus, the wire harness can be attached to the vehicle body without forming a clamp hole in the vehicle body.

The wire harness attachment portion may be made of a resin, the suction cup may be made of rubber, and the wire harness attachment portion and the suction cup may be formed as a continuous integrated product through double molding, or a combined product by preparing the wire harness attachment portion and the suction cup separately and attaching the suction cup to the wire harness attachment portion.

When the suction cup is made of easily deformable rubber such as EPDM as described above, the suction cup can easily spread out into a state in which it adheres to the vehicle body through vacuum suction. On the other hand, when the wire harness attachment portion is a resin molded product, the wire harness can be firmly fastened and attached. Note that the suction cup may also be made of a resin that is soft and easily deformable.

A top portion of the suction cup is continuous with the support shaft that is provided protruding from the wire harness attachment portion.

Specifically, the support shaft that supports the suction cup is provided protruding from an outer surface of an opposite-side wall on the opposite side to the wire harness, of the band locking box of the band clamp, or an offset plate extending from the opposite-side wall.

With respect to the base plate-type clamp, the support shaft that supports the suction cup is provided protruding from a surface, on the opposite side to the wire harness, of the base plate, which is to be attached to the wire harness by wrapping a piece of pressure-sensitive adhesive tape therearound, or an offset plate that is provided protruding from the base plate.

With respect to the corrugated clamp, the support shaft that supports the suction cup is provided protruding from an outer surface of a frame to be externally fitted to the corrugated tube.

A magnetic layer, a gel material layer, or a pressure-sensitive adhesive layer may be provided on an inner surface of the suction cup, so as to increase the fixing strength of the suction cup to the vehicle body.

As described above, the clamp for a wire harness of the present disclosure is fixed to a vehicle body with a suction cup through vacuum suction. Therefore, it is not necessary to provide a clamp hole in the vehicle body. This makes it possible for a wire harness to be attached, via the clamp, to a section of the vehicle body where a clamp hole cannot be provided.

BRIEF DESCRIPTION OF DRAWINGS

FIG. 1 shows a band clamp according to a first embodiment.

FIG. 9 shows a base plate-type clamp according to a second embodiment.

FIG. 10 shows a corrugated clamp according to a third embodiment; FIG. 10(C) is a cross-sectional view showing a state in which the clamp is fixed to a vehicle body.

FIG. 11 shows a modification of the third embodiment; FIG. 11(A) is an exploded perspective view, and FIG. 11(B) is a front view of a suction cup portion.

FIG. 12 is a perspective view showing a conventional example.

DESCRIPTION OF EMBODIMENTS

Hereinafter, embodiments of the present disclosure will be described with reference to the drawings.

Figure 1A:
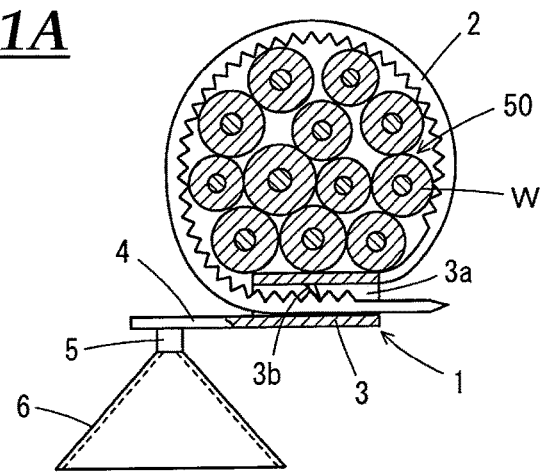
FIG. 1(A) is a partially cross-sectional view showing a state in which the band clamp is attached to a wire harness.
Figure 1B:
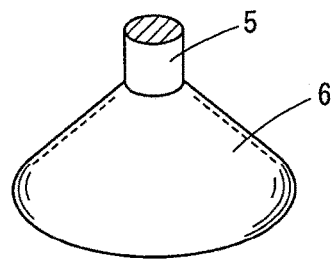
FIG. 1(B) is an enlarged view of a relevant portion of the band clamp.
Figure 1C:
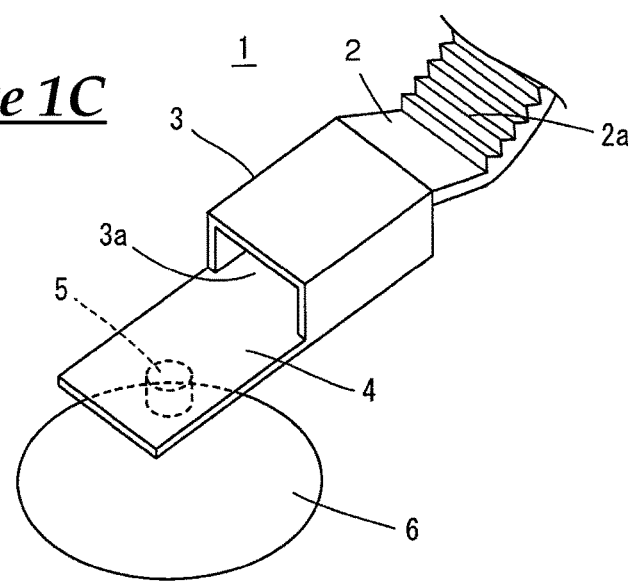
FIG. 1(C) is a perspective view of the band clamp.
Figure 2:
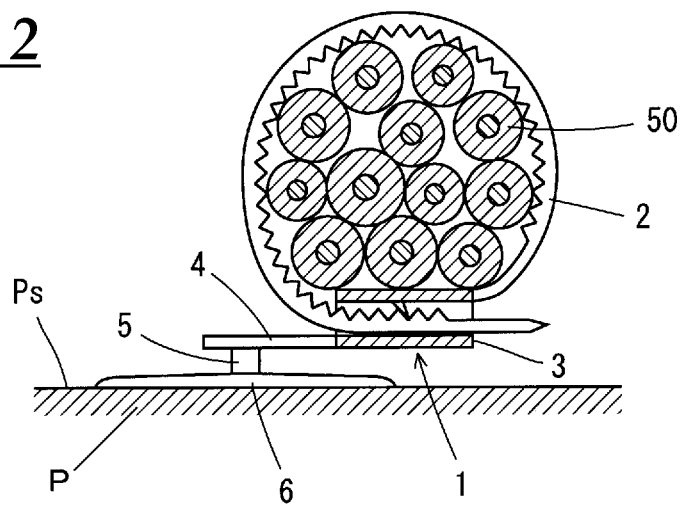
FIG. 2 is a partially cross-sectional view showing a state in which the band clamp is fixed to a vehicle body.

FIGS. 1 and 2 show a first embodiment of the present disclosure.

The first embodiment is constituted by a band clamp 1 fastened to a plurality of wires W constituting a wire harness 50 to be routed in an automobile.

The band clamp 1 has a structure in which a band 2 that is wrapped around the wire harness 50, a band locking box 3, with the band 2 extending from one end of the band locking box 3, an offset plate 4 that is provided protruding laterally from a lower wall portion of the band locking box 3, a support shaft 5 protruding downward from a lower surface of the offset plate 4, and a suction cup 6 that is provided at and is continuous with a lower end of the support shaft 5 are integrally provided. The suction cup 6 is constituted by a vacuum suction cup that, when pressed against a target surface, adheres to the target surface through suction due to a vacuum being created in a joint portion between the suction cup 6 and the target surface.

A wire harness attachment portion constituted by the band 2 and the band locking box 3 has the same configuration as a widely used fastening band, and the band locking box 3 is provided with the offset plate 4, the support shaft 5, and the suction cup 6, which together serve as a vehicle body attachment portion. The suction cup 6 has a conical shape with its diameter increasing toward the protruding end side thereof. An inner peripheral surface of the suction cup 6 is pressed against a vehicle body surface Ps of a vehicle body panel P on which the wire harness is to be routed. Thus, a vacuum is created, joining the inner peripheral surface to the vehicle body surface Ps and thereby causing the inner peripheral surface to be fixed to the vehicle body through suction.

A widely used conventional band clamp is provided with a strip-like locking portion protruding from a band locking box and to be inserted into and locked to a clamp hole formed in a vehicle body. However, according to the present disclosure, the suction cup 6 to be fixed to a vehicle body surface through suction is provided instead of the strip-like locking portion.

Only the suction cup 6 is molded using rubber composed of EPDM. The other portions (the band 2, the band locking box 3, the offset plate 4, and the support shaft 5) are molded using a resin such as polypropylene or polyamide. After these portions have been molded using a resin, the suction cup 6 is formed integrally with these portions so as to be continuous with the support shaft through double molding using the rubber.

The band locking box 3 has a band insertion space 3a surrounded by upper, lower, left, and right walls, and a locking piece 3b protruding into the band insertion space 3a from the upper wall. After the band 2 extending from an upper end of a front-end opening of the band insertion space 3a is wrapped around the wire harness 50, the band 2 is inserted into the band insertion space 3a from a rear-end opening thereof, and the locking piece 3b locks with a saw-toothed locking protrusion 2a provided on the band 2. Thus, the wire harness 50 is fastened by the band 2.

The offset plate 4 protrudes to a position that is not hidden under the wire harness 50 fastened by the band 2. The support shaft 5, which constitutes the central axis of the suction cup 6, protrudes from a lower surface of the offset plate 4 on the protruding end side thereof.

The band clamp 1 having the above-described structure is attached to the wire harness 50 as shown in FIG. 1(A) and fixed to the vehicle body panel P of an automobile as shown in FIG. 2.

That is to say, the band 2 is wrapped around the necessary section of the wire harness 50, then inserted into the band locking box 3, tightened, and thereby attached in advance. In an automobile assembly line, during routing of the wire harness 50 along the vehicle body, the suction cup 6 of the band clamp 1 is disposed on a smooth vehicle body surface Ps at the necessary position on the vehicle body panel P. In this state, the support shaft 5 provided on the offset plate 4 is located at a position that is not hidden by the wire harness 50, and thus, the support shaft 5 is pressed down with a strong force from above. As a result of the support shaft 5 being pressed down in this manner, the suction cup 6 spreads out, and the inner peripheral surface thereof comes into contact with the vehicle body surface Ps under a vacuum. The suction cup 6 is thus fixed to the vehicle body surface through suction.

Once the suction cup 6 adheres to the vehicle body surface Ps through suction, while a vacuum is created on an adhering surface side, atmospheric pressure is applied to the outer surface of the suction cup 6. For this reason, unless a force that pulls the suction cup 6 away from the vehicle body surface Ps acts on the band clamp 1, the band clamp 1 remains fixed to the vehicle body panel P. Note that a section where the wire harness 50 is routed along the vehicle body panel usually cannot be seen from the outside, and therefore there is no risk that the aforementioned pulling force will be applied to the band clamp 1.

Figure 3:
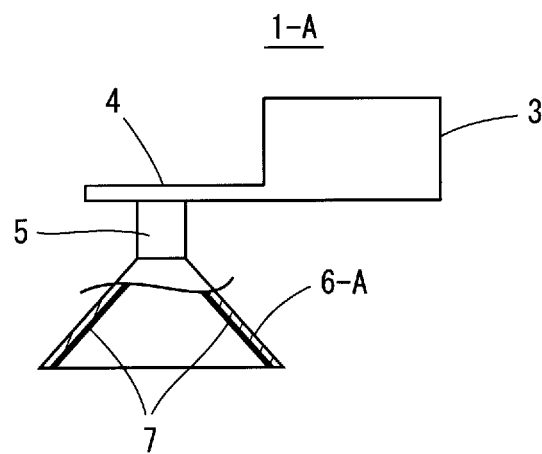
FIG. 3 is a schematic diagram illustrating a first modification of the first embodiment.

FIG. 3 shows a first modification of the first embodiment.

A band clamp 1-A of the first modification has a magnetic layer 7 that is provided by applying a magnetic paint to an inner peripheral surface of a suction cup 6-A. The magnetic paint is composed of a solution in which a magnetic powder, such as ferrite powder or iron powder, is mixed with a resin binder. The magnetic paint is applied to the inner surface of the suction cup 6-A through spraying.

With this structure, while the support shaft 5 is pressed down to spread out the suction cup 6-A, and thereby the inner surface of the suction cup 6-A is pressed against and fixed to the vehicle body surface Ps through suction, the magnetic layer 7 on the inner surface of the suction cup 6-A is fixed to the vehicle body surface made of an iron-based metal plate due to magnetic attraction. The attachment strength of the suction cup 6-A to the vehicle body is thus increased.

Figure 4:
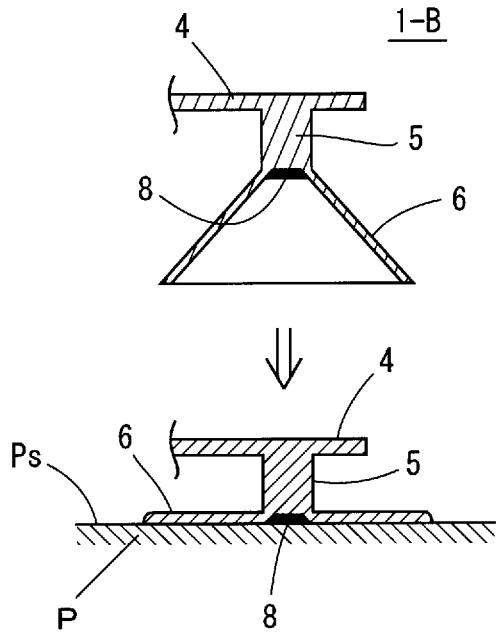
FIG. 4 is a schematic diagram illustrating a second modification of the first embodiment.

FIG. 4 shows a second modification.

In a band clamp 1-B of the second modification, a gel material or pressure-sensitive adhesive material 8 is applied to a lower surface, that is, the inner surface of a central portion of the suction cup 6, of the support shaft 5, which is located at a top surface of the conical suction cup 6. With this structure, the inner surface of the suction cup 6 can be fixed to the vehicle body surface Ps through suction by pressing down the support shaft 5 and spreading out the suction cup 6, and at the same time, the center of the suction cup 6 can be stuck and fixed to the vehicle body surface Ps using the pressure-sensitive adhesive material 8. The attachment strength of the band clamp to the vehicle body can thus be increased.

Figure 5:
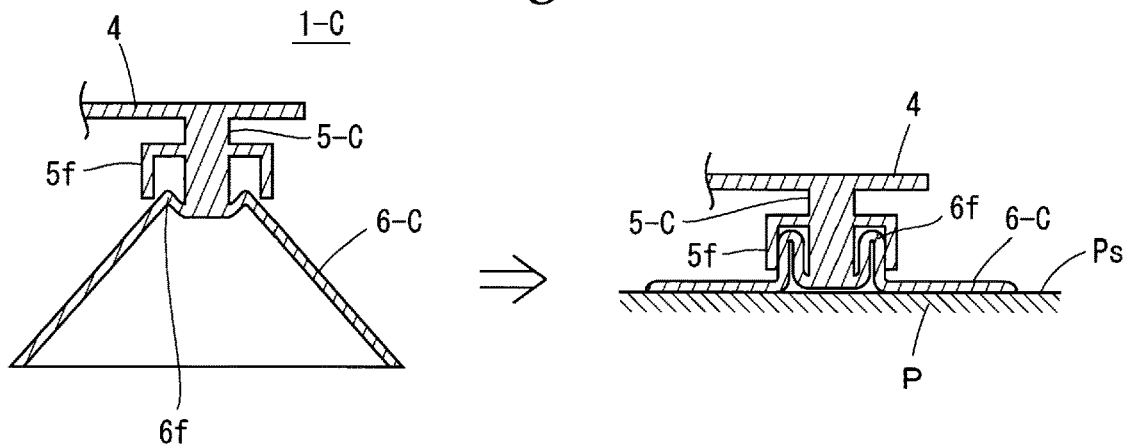
FIG. 5 is a schematic diagram illustrating a third modification of the first embodiment.

FIG. 5 shows a third modification.

A band clamp 1-C of the third modification has an annular holding frame 5f that protrudes from a middle position of the outer circumference of a support shaft 5-C and that has an L-shaped cross section. On the other hand, a folded-back portion 6f surrounding a leading end portion of the support shaft 5-C is provided at a base portion of a suction cup 6-C that is provided protruding from an outer circumferential edge of a lower end of the support shaft 5-C.

With the above-described structure, in the process of causing the suction cup 6-C to adhere to the vehicle body surface Ps through suction, as the support shaft 5-C is pressed down, the suction cup 6-C spreads out from the outer peripheral side toward the vehicle body surface Ps. Also, the folded-back amount of the folded-back portion 6f increases, and the folded-back portion 6f is pushed into the annular holding frame 5f of the support shaft 5-C as it is moved downward. Consequently, an outer peripheral portion of the suction cup 6-C adheres to the vehicle body surface Ps through suction under a vacuum, and an inner peripheral portion of the suction cup 6-C remains pushed into the annular holding frame 5f, and the suction cup 6-C cannot return to its original conical shape. Thus, the suction cup 6-C can be kept fixed to the vehicle body surface Ps through suction, and the attachment reliability can be increased.

Figure 6A:
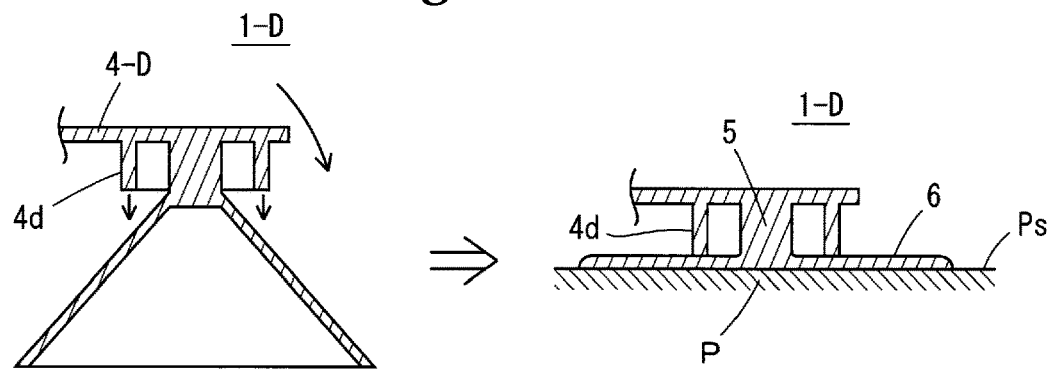
FIG. 6 shows schematic diagrams illustrating a fourth modification of the first embodiment.

FIG. 6 shows a fourth modification.

A band clamp 1-D of the fourth modification has an annular frame protrusion 4d that is provided protruding downward from the lower surface of an offset plate 4-D, from which the support shaft 5 protrudes, so as to surround the base portion of the support shaft 5. When the suction cup 6 is pressed down toward the vehicle body, the offset plate 4-D is also pressed down, and the annular frame protrusion 4d abuts against an outer peripheral surface of the suction cup 6 that is spaced apart from the support shaft 5 disposed at the center of the suction cup 6, and efficiently spreads out the suction cup 6. Since the offset plate D is continuous with the band locking box 3 to which a load toward the vehicle body is applied by the wire harness 50 that is fastened by the band, the force pressing down the offset plate D toward the vehicle body continuously acts on the offset plate D as well, and thus, the force pressing down the suction cup 6 exerted by the annular frame protrusion 4d, which protrudes from the offset plate 4, is maintained.

Figure 6B:
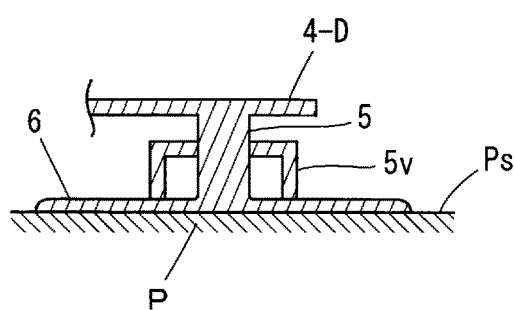

Note that, as shown in FIG. 6(B), an annular frame protrusion 5v that presses the suction cup 6 down may also be provided protruding from the outer circumferential surface of the support shaft 5.

Figure 7:
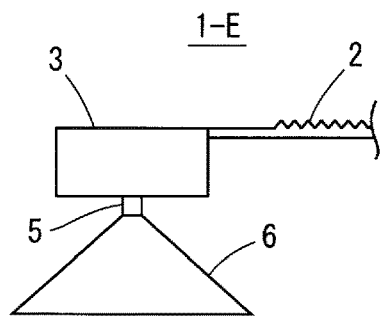
FIG. 7 is a schematic diagram illustrating a fifth modification of the first embodiment.

FIG. 7 shows a fifth modification.

In a band clamp 1-E of the fifth modification, the support shaft 5 is provided protruding from the center of a lower surface of the lower wall of the band locking box 3, and the suction cup 6 is provided extending from the outer circumference of the lower end of the support shaft 5.

When the suction cup 6 for attachment to the vehicle body is provided directly under a wire harness fastening portion as described above, the operation of pressing the suction cup 6 against the vehicle body is performed by pressing down the wire harness toward the vehicle body. In this manner, the suction cup 6 under the wire harness may be pressed against and fixed to the vehicle body through suction by pressing the wire harness toward the vehicle body.

Figure 8:
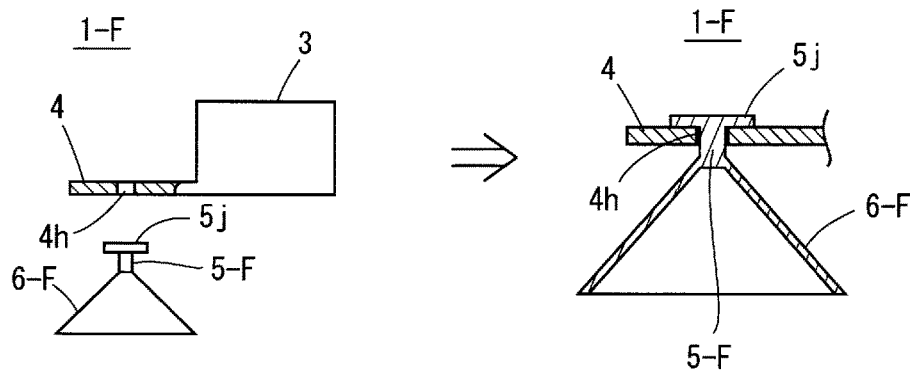
FIG. 8 is a schematic diagram illustrating a sixth modification of the first embodiment.

FIG. 8 shows a sixth modification.

In a band clamp 1-F of the sixth modification, a wire harness attachment portion constituted by a resin molded product and a vehicle body attachment portion obtained by integrally molding a suction cup 6-F and a support shaft 5-F using EPDM are prepared separately. An upper portion of the support shaft 5-F made of EPDM is pushed into an attachment hole provided in the lower wall of the band locking box 3 of the wire harness attachment portion or an attachment hole 4h provided in the offset plate 4 extending from the lower wall, and a head portion 5j having an increased diameter, at a leading end of the upper portion of the support shaft 5-F is locked to the attachment hole 4h.

Thus, the vehicle body attachment portion is attached to the wire harness attachment portion.

With this configuration, it is no longer necessary to form the rubber suction cup of the band clamp through double molding, and therefore molding can be performed with ease.

Furthermore, in the band clamps according to the first embodiment and the first to sixth modifications, the suction cup 6 may be molded using another rubber material instead of EPDM, and may also be formed to be thin-walled by using a resin such as polypropylene, which is flexible and easily deformable, instead of the rubber material.

Furthermore, a configuration may also be adopted in which one end of a lever prepared as a separate component is rotatably attached to the support shaft 5 so that the suction cup can be pressed against the vehicle body by rotating the lever.

Figure 9A:
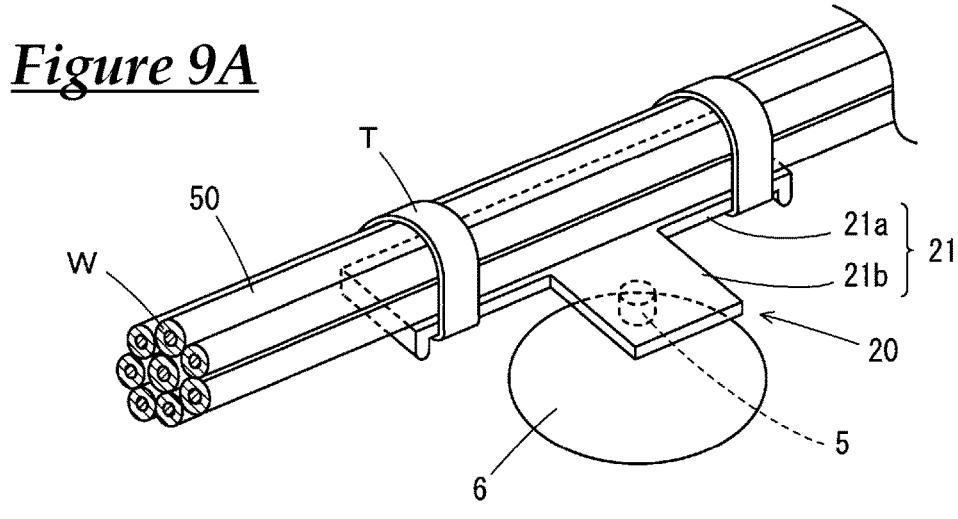
FIG. 9(A) is a perspective view showing a state in which the clamp is attached to a wire harness.
Figure 9B:
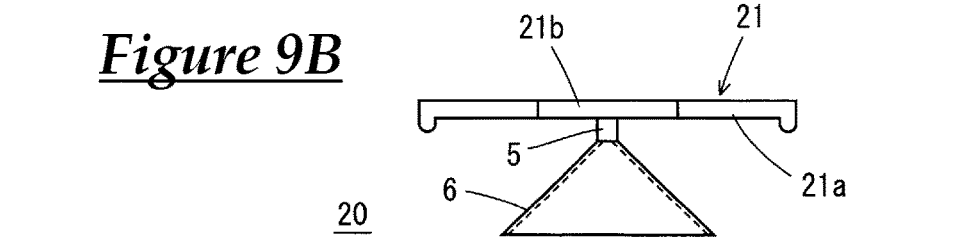
FIG. 9(B) is a schematic front view of the clamp in FIG. 9(A).

FIG. 9 shows a base plate-type clamp according to a second embodiment.

A base plate-type clamp 20 includes, as a wire harness attachment portion, a base plate 21 disposed on the surface of the wire harness 50 along a length direction thereof, and is attached to the wire harness 50 at both ends of the base plate 21 by wrapping respective pieces of pressure-sensitive adhesive tape T therearound. The base plate 21 is of a T-shaped offset type, and the support shaft 5 and the suction cup 6 respectively having the same shapes as those of the first embodiment are provided on an offset portion 21b extending outward from the center of a wrapped-around portion 21a that is attached the wire harness.

The suction cup 6 is integrally molded with the base plate 21 and the support shaft 5 using the same resin. The suction cup 6 is thin-walled and easily deformable. Note that, as is the case with the first embodiment, it is also possible to perform molding using EPDM and form the base plate-type clamp 20 through double molding.

The effect of fixing the suction cup 6 of the base plate-type clamp 20 to a vehicle body through suction is the same as that of the first embodiment, and a description thereof is therefore omitted.

Moreover, the first to sixth modifications of the first embodiment can also be adopted for the base plate-type clamp according to the second embodiment.

Figure 10A:
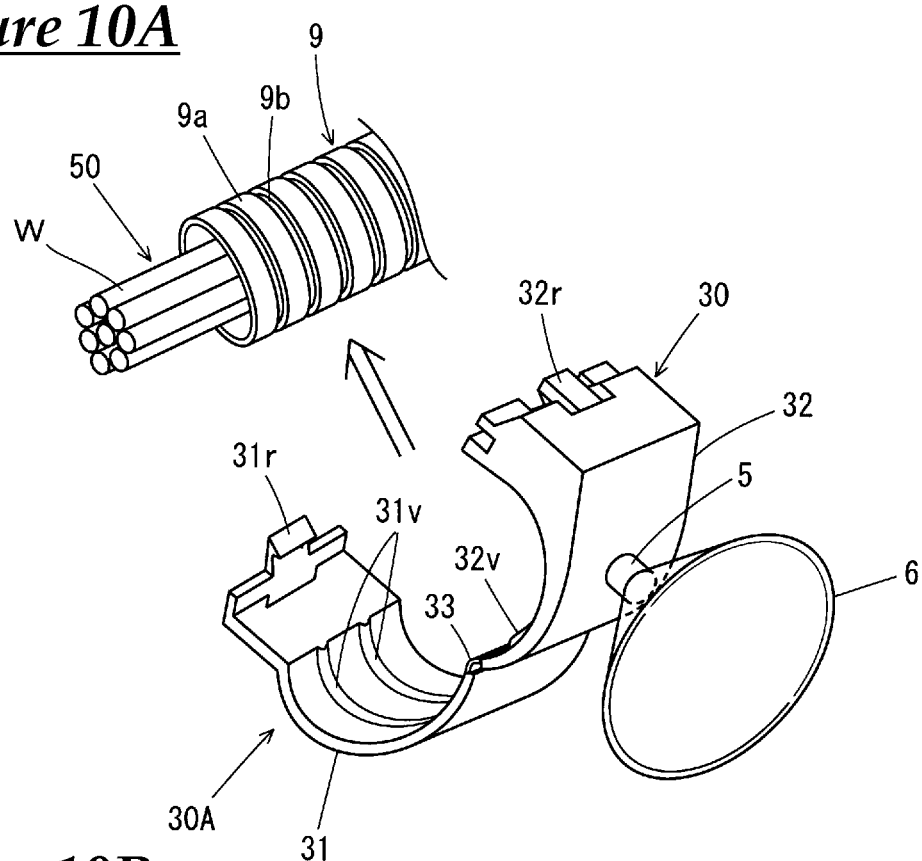
FIG. 10(A) is a perspective view.
Figure 10B:
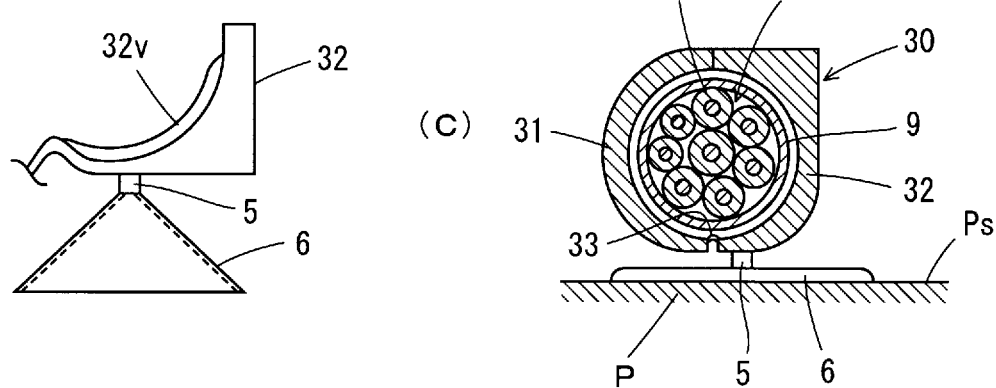
FIG. 10(B) is a side view of a relevant portion of the clamp.

FIG. 10 shows a third embodiment.

A clamp according to the third embodiment is constituted by a corrugated clamp 30 for fixing a corrugated tube 9 with which the wire harness 50 is sheathed to a vehicle body.

The corrugated tube 9 to be attached to the corrugated clamp 30 is constituted by a widely used corrugated tube obtained through continuous extrusion molding, and annular ridges 9a and troughs 9b are provided alternatingly in the length direction of the corrugated tube 9.

The corrugated clamp 30 differs from a widely used corrugated clamp only by a vehicle body locking portion, and a wire harness attachment portion 30A constituting a portion to be externally fitted to the corrugated tube 9 has the same configuration as the conventional configuration. That is to say, a pair of divided bodies 31 and 32 each having a semi-circular ring shape are coupled to each other at one end with a thin-walled hinge portion 33, and the divided bodies 31 and 32 include respective locking portions 31r and 32r that are connectable to each other at the other end. Also, the divided bodies 31 and 32 include, on the respective inner peripheral surfaces, circular arc-shaped protrusions 31v and 32v to be fitted into the troughs 9b of the corrugated tube 9.

The support shaft 5 protrudes from a position on a lower surface of one divided body 32 of the pair of divided bodies, the position being in the vicinity of the thin-walled hinge portion 33, and the suction cup 6 is provided on the support shaft 5. The support shaft 5 is integrally molded with the other portions, namely, the divided bodies 31 and 32 using the same resin, and the suction cup 6 is integrally molded with the other portions using EPDM through double molding.

To attach the corrugated clamp 30 externally fitted to the corrugated tube 9 to the vehicle body panel P, the suction cup 6 is abutted against a smooth vehicle body surface Ps, and the wire harness attachment portion 30A in which the wire harness 50 is internally fitted is pressed down toward the vehicle body such that the suction cup 6 under the wire harness attachment portion 30A spreads out and adheres to the vehicle body surface Ps through suction. Thus, as is the case with the first embodiment, the corrugated clamp 30 can be fixed to the vehicle body panel P through suction as shown in FIG. 10(C).

FIG. 11 shows a modification of the corrugated clamp according to the third embodiment.

In a corrugated clamp 30-G of this modification, a separate vehicle body attachment portion 35 obtained through resin molding in which a support shaft 5-G and a suction cup 6-G are integrally molded using EPDM is attached to the wire harness attachment portion 30A by inserting the support shaft 5-G into an attachment hole 32h formed in the divided body 32 of the wire harness attachment portion 30A.

More specifically, a head portion 35a having a larger diameter than the attachment hole 32h is provided protruding from an upper end of the support shaft 5-G, and after the head portion 35a is constricted and inserted into the attachment hole 32h, the head portion 35a is restored to its original shape and thus locked to the attachment hole 32h. Moreover, ribs 35b to be fitted into respective troughs 9b of the corrugated tube 9 are provided on an upper surface of the head portion 35a so that the vehicle body attachment portion 35 can be fitted to the corrugated tube 9 and prevented from becoming displaced.

Otherwise, the configuration and the effect of this modification are the same as those of the corrugated clamp 30 shown in FIG. 10, and a description thereof is therefore omitted.

Moreover, the first to sixth modifications of the first embodiment can also be adopted for the corrugated clamp according to the third embodiment.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Band clamp
2 Band
3 Band locking box
4 Offset plate
5 Support shaft
6 Suction cup
9 Corrugated tube
20 Base plate-type clamp
30 Corrugated clamp
50 Wire harness
W Wire
P Vehicle body panel
Ps Vehicle body surface

The invention claimed is:

1. A clamp for a wire harness constituted by a band clamp to be attached to a wire harness routed in a vehicle by wrapping a band around the wire harness, a base plate-type clamp to be attached to a wire harness using a piece of pressure-sensitive adhesive tape, or a corrugated clamp to be attached to a corrugated tube in which a wire harness is inserted, the clamp comprising:
 a wire harness attachment portion constituted by:
  the band of the band clamp, an offset plate of the band clamp that is separate from the band, and a band locking box of the band clamp that is connected to the offset plate,
  a base plate of the base plate-type clamp, or
  an externally fitted portion of the corrugated clamp; and
 a suction cup protruding from the offset plate of the band clamp, the base plate of the base plate-type clamp, or the externally-fitted portion of the corrugated clamp,
 wherein the wire harness attachment portion is made of a resin, the suction cup is made of rubber, and the wire harness attachment portion and the suction cup are formed as a continuous integrated product through double molding, or a combined product by preparing the wire harness attachment portion and the suction cup separately and attaching the suction cup to the wire harness attachment portion, and
 the clamp has a structure in which the suction cup is pressed against and spread out on a vehicle body surface to be thereby fixed thereto through suction.

2. A clamp for a wire harness constituted by a band clamp to be attached to a wire harness routed in a vehicle by wrapping a band around the wire harness, a base plate-type clamp to be attached to a wire harness using a piece of pressure-sensitive adhesive tape, or a corrugated clamp to be attached to a corrugated tube in which a wire harness is inserted, the clamp comprising:
 a wire harness attachment portion constituted by a band and a band locking box of the band clamp, a base plate of the base plate-type clamp, or an externally fitted portion of the corrugated clamp; and
 a suction cup protruding from the wire harness attachment portion,
 wherein a magnetic layer, a gel material layer, or a pressure-sensitive adhesive layer is provided on an inner surface of the suction cup, and
 the clamp has a structure in which the suction cup is pressed against and spread out on a vehicle body surface to be thereby fixed thereto through suction.

* * * * *